US012750127B2

(12) United States Patent
Vivanco et al.

(10) Patent No.: US 12,750,127 B2
(45) Date of Patent: Sep. 29, 2026

(54) METHODS AND SYSTEMS FOR NETWORK AWARENESS OF DISCONTINUOUS COVERAGE BY NON-TERRESTRIAL NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 367 days.

(21) Appl. No.: 18/602,781

(22) Filed: Mar. 12, 2024

(65) Prior Publication Data

US 2025/0293763 A1 Sep. 18, 2025

(51) Int. Cl.
*H04B 7/185* (2006.01)
*H04W 68/00* (2009.01)

(52) U.S. Cl.
CPC ...... *H04B 7/18513* (2013.01); *H04W 68/005* (2013.01)

(58) Field of Classification Search
CPC ......................... H04B 7/18513; H04W 68/005
USPC ......................................... 370/310, 315, 316
See application file for complete search history.

(56) References Cited

U.S. PATENT DOCUMENTS

| | | | | |
|---|---|---|---|---|
| 2024/0414764 A1* | 12/2024 | Lauridsen | ............ | H04B 7/1851 |
| 2025/0175247 A1* | 5/2025 | Pan | .................... | H04B 7/18545 |
| 2025/0211326 A1* | 6/2025 | Atungsiri | ........... | H04B 7/18545 |
| 2025/0350354 A1* | 11/2025 | Rune | ..................... | H04W 16/22 |

* cited by examiner

*Primary Examiner* — Obaidul Huq
(74) *Attorney, Agent, or Firm* — Guntin & Gust, PLC; Erik Boyd

(57) ABSTRACT

Aspects of the subject disclosure may include, for example, obtaining satellite data indicative of satellite communication coverage areas associated with a plurality of satellites, wherein the satellite data includes locations for the satellite communication coverage areas as well as duration times for the satellite communication coverage areas; obtaining mobile device data associated with a plurality of mobile devices that are respectively attached to a wireless network, wherein the mobile device data indicates a respective location of each of the plurality of mobile devices, and wherein the plurality of mobile devices includes a first mobile device; determining whether the wireless network has information to be sent to the first mobile device, resulting in a first determination; determining, based upon the satellite data and a first location of the first mobile device, whether a period of time that the first mobile device is predicted to be out of the communication coverage areas meets a threshold, resulting in a second determination; and responsive to the first determination being that the wireless network has information to be sent to the first mobile device and to the second determination being that the period of time meets the threshold, facilitating an action. Other embodiments are disclosed.

20 Claims, 10 Drawing Sheets

2000

200

250

2000

2100

2200

300

600

METHODS AND SYSTEMS FOR NETWORK AWARENESS OF DISCONTINUOUS COVERAGE BY NON-TERRESTRIAL NETWORKS

CROSS REFERENCE TO RELATED APPLICATION(S)

This application is related to U.S. application Ser. No. 18/470,125, filed Sep. 19, 2023. All sections of the aforementioned application(s) and/or patent(s) are incorporated herein by reference in their entirety.

FIELD OF THE DISCLOSURE

The subject disclosure relates to methods and systems for network awareness of discontinuous coverage by non-terrestrial networks.

BACKGROUND

A cellular service provider (CSP) with a terrestrial cellular network (TN) may own a direct cellular-to-satellite non-terrestrial network in addition to the terrestrial network. A cellular-to-satellite non-terrestrial network (NTN) can create a direct connection from a customer's/subscriber's garden variety cellular telephone using LTE, 5G, GSM, UMTS, 6G (or other commercially-available cellular technology user equipment (UE)) to a satellite (wherein the satellite must use frequency bands that the UE is already designed to communicate with, and must use either unlicensed bands or bands that are licensed to the CSP).

Satellite cells may be used to provide additional coverage or capacity to terrestrial cells. Satellite cells may have the ability to use one or more cells, and to operate at different frequency bands (e.g., B5, B14). A CSP (or wireless operator) may have the ability to mandate satellite cells to change frequency bands (e.g., to avoid interference with terrestrial cells, which may operate in the same frequency band).

A CSP can use satellite cells to provide additional service capacity to specific areas at specific hours of the day (e.g., busy hour). Also, a CSP may have the ability to control the coverage of the satellite cells and/or schedule the actuation of the satellite cells (e.g., in such a way that satellite cells orbiting over the congested terrestrial RAN areas provide coverage at their corresponding busy times).

A CSP is typically aware of the time and duration that the satellite cells will cover the congested areas. The CSP is also typically aware of the frequency bands used in the terrestrial cells, and also is aware of the phone capabilities and bands that they support (a given CSP may use different frequency bands in different locations).

Accordingly, a CSP can use certain conventional traffic management techniques to offload traffic from a terrestrial cellular network to a non-terrestrial network.

With reference now to the satellites themselves, it is noted that a CSP may deploy several satellite cells in a batch (constellation), and each satellite cell may have a predefined coverage area (e.g., 50 Km radius). A coverage area may be driven, for example, by antenna gain, antenna tilt, beamforming techniques, or other factors. Satellite cells may be managed in a specific formation in an effort to provide continuous coverage to terrestrial UEs. A constellation of satellite cells can typically provide larger continuous coverage based on the number of satellite cells in the group. However, there may be coverage holes within a constellation of satellite cells (as well as large coverage gaps in between multiple constellations). Therefore, it is likely that a given UE may experience one or more radio link failures (RLF) when it gets out of the non-terrestrial coverage.

With reference now to satellite location, certain conventional time-stamped satellite ephemeris data refers to a table comprising a set of parameters that can be used to accurately calculate the location of a satellite at a specific moment in time, and hence describes the path the satellite is following as it orbits Earth. Satellite ephemeris data is typically only valid for a limited time. Satellite ephemeris data may contain position, velocity, and other satellite state information of a satellite during a given period of time.

BRIEF DESCRIPTION OF THE DRAWINGS

Reference will now be made to the accompanying drawings, which are not necessarily drawn to scale, and wherein.

DETAILED DESCRIPTION

Figure 1:
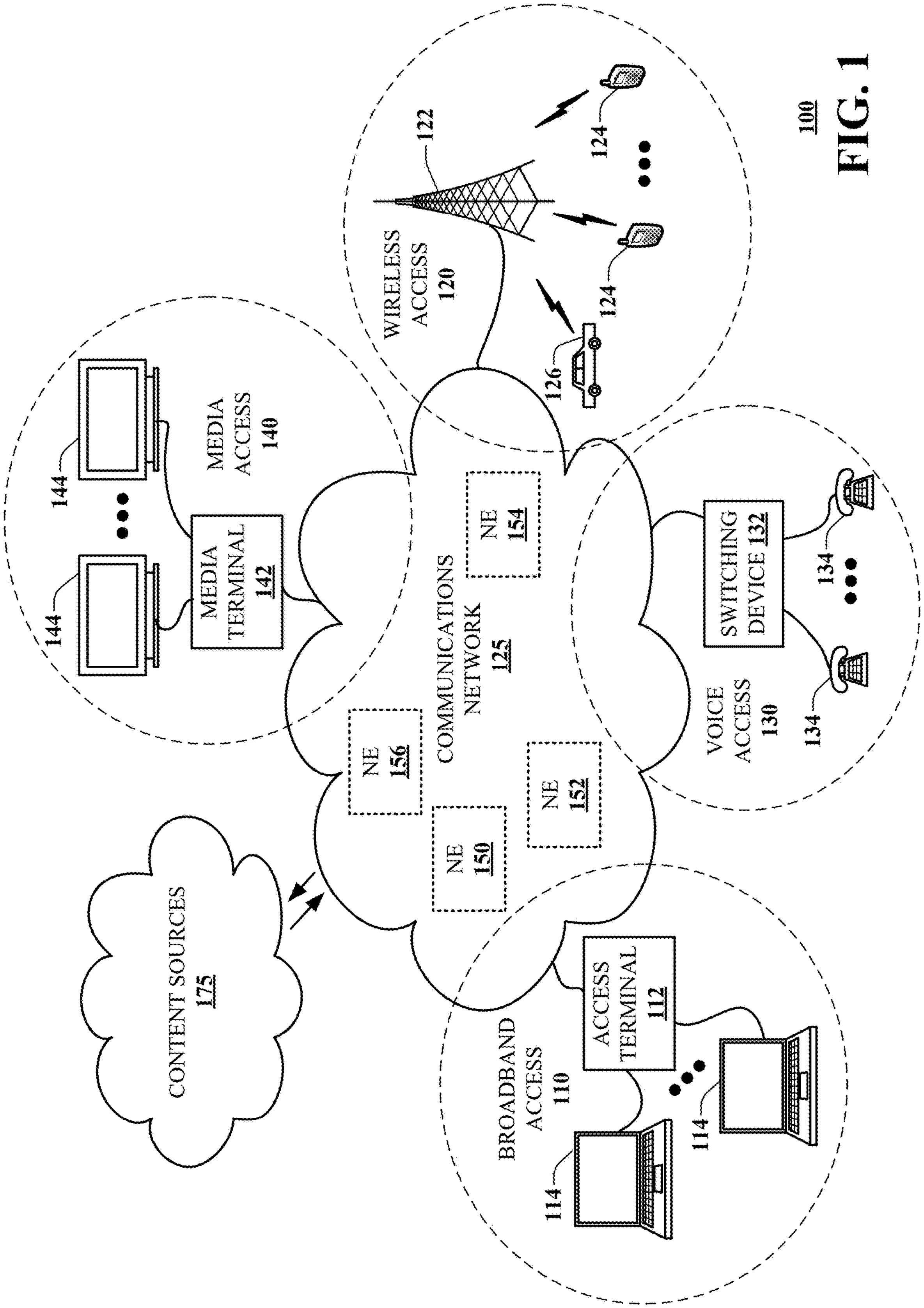
FIG. 1 is a block diagram illustrating an example, non-limiting embodiment of a communication network in accordance with various aspects described herein.

The subject disclosure describes, among other things, illustrative embodiments for network awareness of discontinuous coverage by non-terrestrial networks (e.g., by non-terrestrial LTE, 5G, and/or subsequent generation satellite networks). In various embodiments, the non-terrestrial networks can comprise one or more Low Earth Orbit (LEO) satellite networks. Other embodiments are described in the subject disclosure.

One or more aspects of the subject disclosure include a device comprising: a processing system including a processor; and a memory that stores executable instructions that, when executed by the processing system, facilitate performance of operations, the operations comprising: obtaining satellite data indicative of satellite communication coverage areas associated with a plurality of satellites, wherein the satellite data includes locations for the satellite communication coverage areas as well as duration times for the satellite communication coverage areas; obtaining mobile device data associated with a plurality of mobile devices that are respectively attached to a wireless network, wherein the mobile device data indicates a respective location of each of the plurality of mobile devices, and wherein the plurality of mobile devices includes a first mobile device; determining whether the wireless network has information to be sent to the first mobile device, resulting in a first determination; determining, based upon the satellite data and a first location of the first mobile device, whether a period of time that the first mobile device is predicted to be out of the satellite communication coverage areas meets a threshold, resulting in a second determination; and responsive to the first determination being that the wireless network has information to be sent to the first mobile device and to the second determination being that the period of time meets the threshold, facilitating an action selected from: prohibiting the wireless network from sending a paging message to the first mobile device during the period of time; discarding the information that was to be sent to the first mobile device; or not taking (either of the two previously enumerated) additional actions and instead allowing data to be attempted to be transmitted from the wireless network to the mobile device.

One or more aspects of the subject disclosure include a non-transitory machine-readable medium comprising executable instructions that, when executed by a processing system including a processor, facilitate performance of operations, the operations comprising: obtaining, for a constellation of Low Earth Orbit (LEO) satellites, satellite ephemeris data; predicting, based upon the satellite ephemeris data, a coverage map, wherein the coverage map comprises predicted locations at which satellite communications coverage will be available as well as respective times associated with the predicted locations; predicting for a first end-user device of a plurality of end-user devices one or more future locations, resulting in one or more predicted future locations; determining, based upon the coverage map and the one or more predicted future locations, a predicted time at which the first end-user device is predicted to be out of the satellite communication coverage; determining a time period between a current time and the predicted time; determining whether the time period meets a time threshold, resulting in a determination; and responsive to the determination being that the time period meets the time threshold, facilitating an action selected from: prioritizing a downloading of download traffic to the first end-user device; prioritizing an uploading of upload traffic from the first end-user device; mandating that the first end-user device be disconnected from a network node prior to the predicted time; or any combination thereof.

One or more aspects of the subject disclosure include a method, comprising: receiving, by a processing system of a mobile communication device including a processor, data identifying expected satellite coverage; obtaining, by the processing system, a location of the mobile communication device; predicting, based upon the expected satellite coverage and the location of the mobile communication device, a length of time associated with a predicted satellite coverage gap; and based upon the length of time associated with the predicted satellite coverage gap, facilitating, by the processing system, an action selected from the following: in a first case that the length of time associated with the predicted satellite coverage gap meets a first time threshold, cause the mobile communication device to enter a dormant state during the length of time associated with the predicted satellite coverage gap; in a second case that a battery state of the mobile communication device meets a power threshold, cause the mobile communication device to enter the dormant state during the length of time associated with the predicted satellite coverage gap; in a third case that the length of time associated with the predicted satellite coverage gap does not meet a second time threshold, and an urgency to transmit outgoing data meets an outgoing data urgency threshold, cause the mobile communication device to continue attempting to transmit the outgoing data; in a fourth case that the length of time associated with the predicted satellite coverage gap does not meet the second time threshold, and an urgency to receive incoming data meets an incoming data urgency threshold, cause the mobile communication device to continue attempting to receive the incoming data; or any combination thereof.

Referring now to FIG. 1, a block diagram is shown illustrating an example, non-limiting embodiment of a system 100 in accordance with various aspects described herein. For example, system 100 can facilitate in whole or in part traffic management for non-terrestrial satellite networks (e.g., traffic management carried out by a network and/or traffic management carried out by user equipment). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
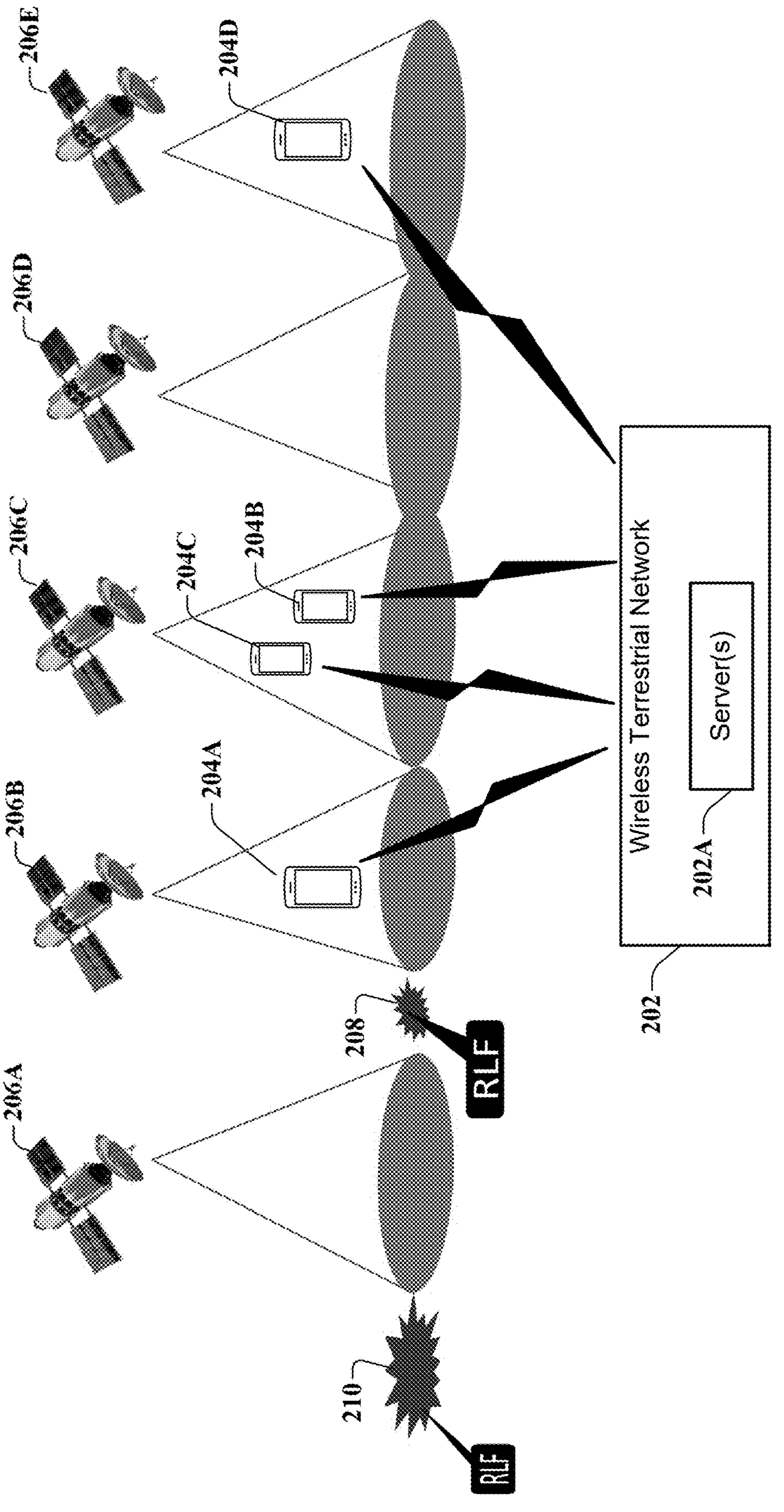
FIG. 2A is a block diagram illustrating an example, non-limiting embodiment of a system (which can function fully or partially within the communication network of FIG. 1) in accordance with various aspects described herein.

Referring now to FIG. 2A, this shows a block diagram illustrating an example, non-limiting embodiment of a system 200 (which can function fully or partially within the communication network of FIG. 1) in accordance with various aspects described herein. As seen in this figure, wireless terrestrial network 202 is configured for wireless communications with a plurality of devices 204A, 204B, 204C, 204D. In various embodiments, the wireless terrestrial network 202 comprises a cellular network, an LTE network, a fifth generation (5G) cellular network, a sixth generation (6G) cellular network, a subsequent generation cellular network, one or more RANs, one or more eNBs, one or more gNBs, one or more SONs, one or more RICs, or any combination thereof. In various embodiments, each of devices 204A, 204B, 204C, 204D comprises a respective wearable device, a respective smartwatch; a respective smartphone, a respective cellphone, a respective laptop computer, a respective notebook computer, a respective tablet, or any respective combination thereof.

Still referring to FIG. 2A, it is seen that a plurality of satellites 206A, 206B, 206C, 206D, 206E form a constellation (or batch) of satellite cells that can be used to provide larger/contiguous coverage to terrestrial UEs. In various embodiments, each of satellites 206A, 206B, 206C, 206D, 206E can comprise a low earth orbit (LEO) satellite.

Still referring to FIG. 2A, it is seen that server(s) 202A can be part of wireless terrestrial network 202. These server(s) 202A can comprise hardware, firmware, and/or software for carrying out various traffic management techniques as described herein. In various embodiments, the server(s) 202A can be part of the wireless terrestrial network 202 and/or can be located separate (e.g., remotely) from the wireless terrestrial network 202. Of course, while four devices (204A-204D) are shown in this figure, any desired number of such devices can be supported. Further, while five satellites (206A-206E) are shown in this figure, any desired number of satellites can be supported. In various embodiments, the server(s) 202A can control and/or direct traffic management among the devices (204A-204D and the satellites (206A-206E).

As described herein, various embodiments can provide a traffic management solution for heterogeneous terrestrial and satellite networks (e.g., LTE, 5G, 6G, subsequent generation) based on estimated UE location and satellite coverage. In various examples, an algorithm for making traffic management decisions can reside on one or more UEs, at the network, at the RAN, and/or behind the eNB/gNB (e.g., SON, RIC). In one example, an algorithm for making traffic management decisions can alleviate (or at least partially alleviate) connectivity issues caused by a hole (or gap) in coverage between two satellites of a constellation (see, e.g., Radio Link Failure (RLF) 208). In one example, an algorithm for making traffic management decisions can alleviate (or at least partially alleviate) connectivity issues caused by a hole (or gap) in coverage between two constellations (see, e.g., Radio Link Failure (RLF) 210).

Figure 2B:
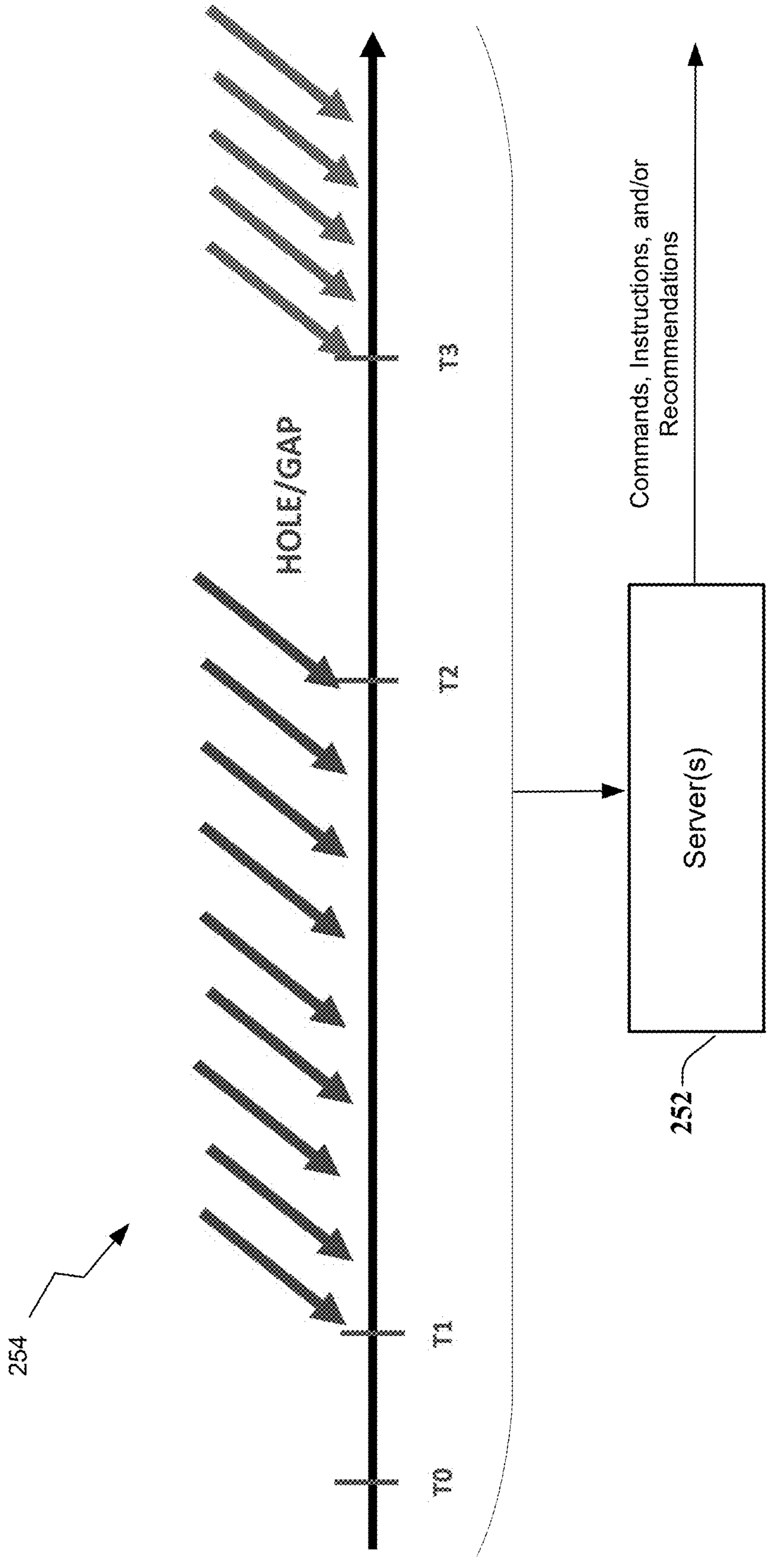
FIG. 2B is a block diagram illustrating an example, non-limiting embodiment of a system (which can function fully or partially within the communication network of FIG. 1) in accordance with various aspects described herein.

Referring now to FIG. 2B, this shows a block diagram illustrating an example, non-limiting embodiment of a system 250 (which can function fully or partially within the communication network of FIG. 1) in accordance with various aspects described herein. As seen in this figure, server(s) 252 can receive various information (including satellite ephemeris data 254—shown graphically here along a timeline) and in response to the received information make one or more decisions (as described herein) and output one or more commands, instructions, recommendations, or the like (as described herein). In various embodiments, the server(s) 252 can be part of a wireless terrestrial network and/or can be remote from and in operative communication with a wireless terrestrial network.

Still referring to FIG. 2B, it is seen that time-stamped satellite ephemeris data 254 can be used to indicate the start-time and end-time of the serving and/or incoming satellite's coverage (this information depends, for example, on a given Satellite Cell state and configuration and UE location). In the example shown in this figure, at time TO the UE has no Satellite Coverage, at time T1 the UE starts receiving Satellite Coverage from Cell.1, at time T2 the UE stops receiving Satellite Coverage from Cell.1, and at time T3 the UE starts receiving Satellite Coverage from Cell.2. With respect to this example:

- During Time Interval T2-T1 the UE will experience RLF and therefore will disconnect from the network. During that time interval, UE will attempt to search for and connect to the available RAN eNB (satellite or terrestrial). Small Time Interval T2-T1 may be coverage holes in between Satellite Cells. However, large Time Interval T2-T1 may be coverage GAPs in between Satellite Constellation. Moreover, T2-T1=0 or negative denotes, no coverage holes between satellite cell #1 and satellite cell #2
- The UE would typically (absent use of various embodiments described herein) waste battery power attempting to search/connect during Interval T2-T1. The core network would typically (absent use of various embodiments described herein) not be aware that UE has disconnected due to satellite coverage hole/gap (the core network may assume the UE is out of RAN coverage if it receives no response from UE during Time Interval T2-T1).
- Another UE (UE #2) may have different event timestamps T1*, T2*, T3*, since the location of UE #2 would likely differ from the location of the UE #1 (even though both UEs are (in this example) under the same satellite cell coverage.

Reference will now be made to various embodiments directed to network awareness of discontinuous coverage by non-terrestrial networks (e.g., LTE, 5G, and/or later generation networks). In such embodiments, an algorithm can be executed on the network (e.g., on a wireless terrestrial network and/or on a wireless non-terrestrial network). The algorithm executed on the network can receive and/or generate various information/data such as described herein (e.g., data related to satellite coverage). The algorithm executed on the network can utilize the received and/or generated data/information (along with other data/information from a UE (e.g., its location)) in order to manage (or help to manage) traffic. This management of traffic can be implemented by one or more actions, including (for example):

- If the algorithm determines that a UE is in a coverage hole/gap and data (e.g., incoming call/text) is received for this UE, then the algorithm can decide an action based on predicted coverage disruption:
  - In one embodiment, the algorithm can mandate the core network not to page the UE, but rather hold the paging message until the algorithm predicts that the UE will get into coverage (e.g., start.coverage.time of next upcoming satellite cell).
  - In one embodiment (in a scenario that the algorithm estimates that the next start.coverage.time is too far away (e.g., above a time threshold such that a next satellite cell may arrive in several hours), the algorithm can mandate the core network to discard the received data for the UE and notify the application (e.g., sending application) that the UE is out coverage.
  - In one embodiment (in a scenario that the algorithm estimates that the next start.coverage.time is very close (e.g., below a time threshold such that there is a small coverage hole/gap), the algorithm can take no action.
- If the algorithm determines that a UE is currently under satellite cell coverage, but that the UE is about to exit the coverage (e.g., end.coverage.time is approaching soon, such as below a time threshold), then the algorithm can mandate the RAN and core to prioritize UE traffic to allow quick download/upload before this UE disconnects. In addition, the algorithm can mandate the RAN to disconnect this UE from satellite cell before it disconnects abruptly from RAN.
- The algorithm can send a Satellite Coverage Map to a UE to allow the UE to decide if movement is necessary to receive satellite coverage (for example, a Satellite Coverage Map application (app) at the UE can be refreshed with current data from the network algorithm). A user of the UE can use this Satellite Coverage Map app to observe current and upcoming satellite coverage and decide if movement is needed to get under satellite coverage.

Reference will now be made to various embodiments directed to user terminal (or user equipment) support and prediction for discontinuous coverage over non-terrestrial networks (e.g., LTE, 5G, and/or later generation networks). In such embodiments, an algorithm can be executed on the UE. The algorithm executed on the UE can receive various information/data such as described herein (e.g., data related to satellite coverage). The algorithm executed on the UE can utilize the received data/information (along with other data/information known by the UE (e.g., its location)) in order to manage (or help to manage) traffic. This management of traffic can be implemented by one or more actions, including (for example):

- If coverage hole/gap is predicted to be small (e.g., below a size threshold and/or below a length of time threshold) and there is an urgency (e.g., above an urgency threshold) to transmit/receive data and UE battery is high enough (e.g., above an available power threshold), then no action should be taken.
- If coverage hole/gap is predicted to be large (above a size threshold and/or above a length of time threshold), and/or UE battery is low (e.g., below an available power threshold), and/or there is no urgency (e.g., below an urgency threshold) to transmit/receive data, then the algorithm at the UE will mandate the UE to enter a dormant stage during the predicted hole/gap time interval, in which all radio circuitry is turned off.
- The algorithm at the UE can also use this information to suggest UE movement if it is determined that non-terrestrial coverage may be detected nearby. For example: If UE moves 0.5Mile NE it may receive satellite coverage from another satellite cell without disruption for 20 min.
- The algorithm at the UE can instruct the UE to (1) stop TX/RX, (2) disconnect from RAN/core if it determines that the UE is about to exit satellite coverage.
- The algorithm at the UE can instruct the UE to send a Radio Link Failure (RLF) report including a reason of disconnecting in a FLAG: "Non-Terrestrial Coverage hole/gap" together with cell.ID and Time. Stamp and UE location, which can be used (e.g., by an algorithm executed on the network) to fine-tune a coverage model. In one example, the RLF report will be sent next time UE attaches to the RAN after disconnecting.

Still referring to various embodiments directed to user terminal (or user equipment) support and prediction for discontinuous coverage over non-terrestrial networks, in various examples the start_time and end_time of the serving satellite cell and the neighbouring satellite cells can be used to estimate upcoming coverage, during the satellite coverage, and coverage discontinuity. This information can be sent to the UE, if the UE is attached to the RAN network. In other examples, if a UE is already attached to the cell (either in Connected Mode or Idle mode) it will be able to receive coverage.satellilte.start.time and coverage.satellilte.end.time from the serving cell. This can be sent during initial attachment, or in any other dedicated message. This information can be updated based on UE movement and/or other conditions. The serving cell can also send coverage.satellilte.start.time/coverage.satellilte.end.time of neighboring satellite cells that UE may detect in the near future.

Figure 2C:
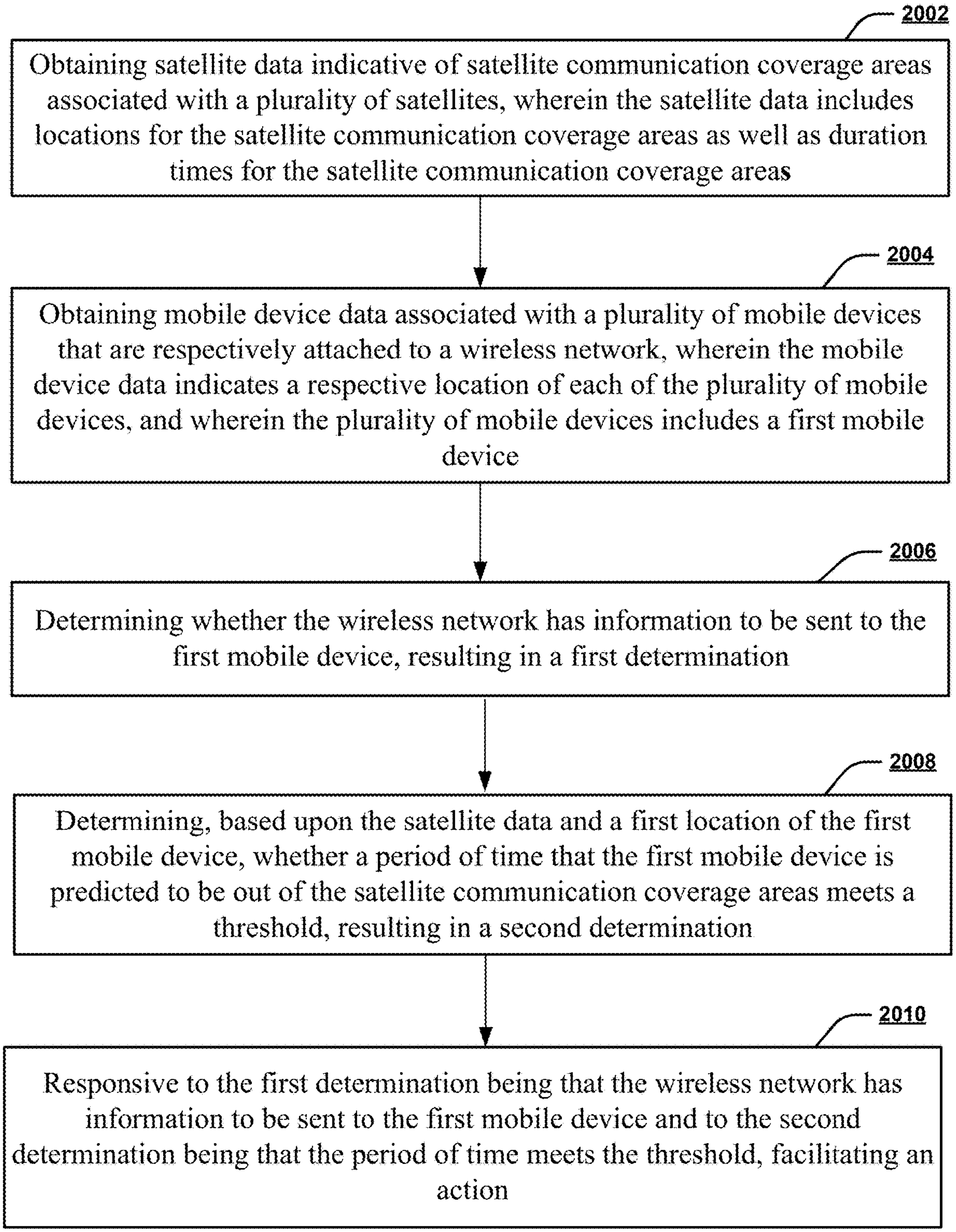
FIG. 2C depicts an illustrative embodiment of a method in accordance with various aspects described herein.

Referring now to FIG. 2C, various steps of a method 2000 according to an embodiment are shown. As seen in this FIG. 2C, step 2002 comprises obtaining satellite data indicative of satellite communication coverage areas associated with a plurality of satellites, wherein the satellite data includes locations for the satellite communication coverage areas as well as duration times for the satellite communication coverage areas. Next, step 2004 comprises obtaining mobile device data associated with a plurality of mobile devices that are respectively attached to a wireless network, wherein the mobile device data indicates a respective location of each of the plurality of mobile devices, and wherein the plurality of mobile devices includes a first mobile device. Next, step 2006 comprises determining whether the wireless network has information to be sent to the first mobile device, resulting in a first determination. Next, step 2008 comprises determining, based upon the satellite data and a first location of the first mobile device, whether a period of time that the first mobile device is predicted to be out of the satellite communication coverage areas meets a threshold, resulting in a second determination. Next, step 2010 comprises responsive to the first determination being that the wireless network has information to be sent to the first mobile device and to the second determination being that the period of time meets the threshold, facilitating an action selected from: prohibiting the wireless network from sending a paging message to the first mobile device during the period of time; discarding the information that was to be sent to the first mobile device; or not taking (either of the two previously enumerated) additional actions and instead allowing data to be attempted to be transmitted from the wireless network to the mobile device.

While for purposes of simplicity of explanation, the respective processes are shown and described as a series of blocks in FIG. 2C it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
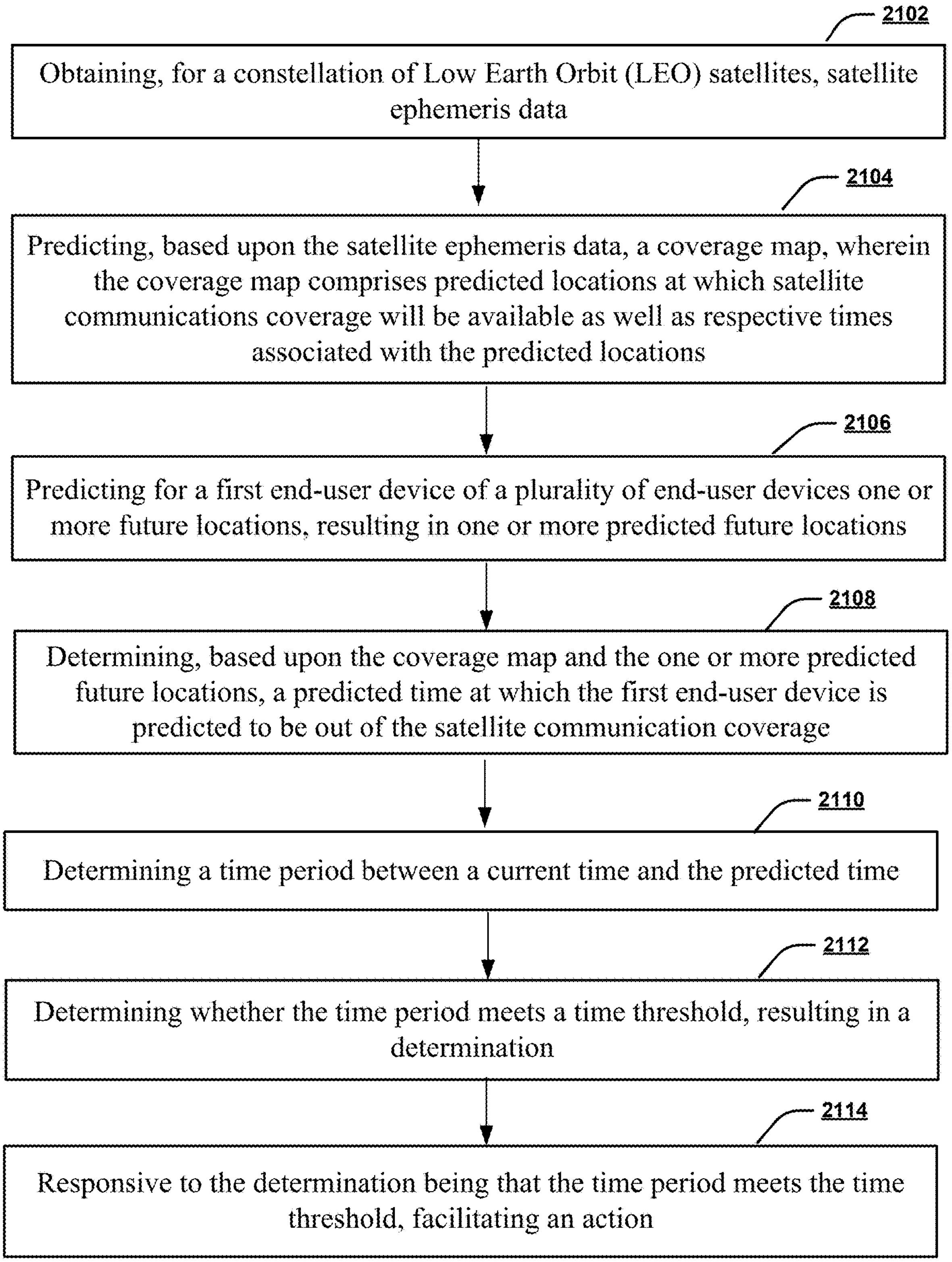
FIG. 2D depicts an illustrative embodiment of a method in accordance with various aspects described herein.

Referring now to FIG. 2D, various steps of a method 2100 according to an embodiment are shown. As seen in this FIG. 2D, step 2102 comprises obtaining, for a constellation of Low Earth Orbit (LEO) satellites, satellite ephemeris data. Next, step 2104 comprises predicting, based upon the satellite ephemeris data, a coverage map, wherein the coverage map comprises predicted locations at which satellite communications coverage will be available as well as respective times associated with the predicted locations. Next, step 2106 comprises predicting for a first end-user device of a plurality of end-user devices one or more future locations, resulting in one or more predicted future locations. Next, step 2108 comprises determining, based upon the coverage map and the one or more predicted future locations, a predicted time at which the first end-user device is predicted to be out of the satellite communication coverage. Next, step 2110 comprises determining a time period between a current time and the predicted time. Next, step 2112 comprises determining whether the time period meets a time threshold, resulting in a determination. Next, step 2114 comprises responsive to the determination being that the time period meets the time threshold, facilitating an action selected from: prioritizing a downloading of download traffic to the first end-user device; prioritizing an uploading of upload traffic from the first end-user device; mandating that the first end-user device be disconnected from a network node prior to the predicted time; or any combination thereof.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
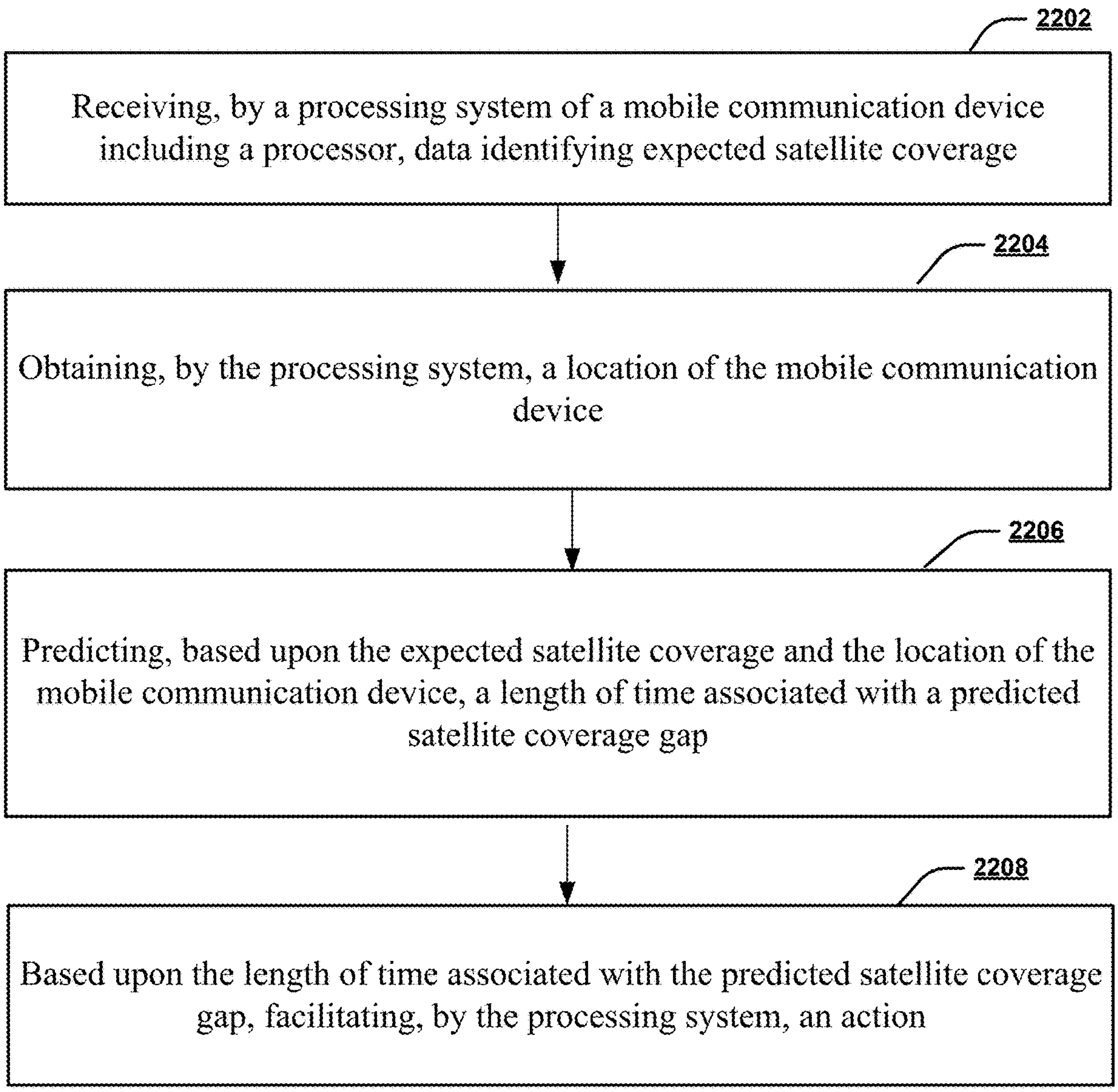
FIG. 2E depicts an illustrative embodiment of a method in accordance with various aspects described herein.

Referring now to FIG. 2E, various steps of a method 2200 according to an embodiment are shown. As seen in this FIG. 2E, step 2202 comprises receiving, by a processing system of a mobile communication device including a processor, data identifying expected satellite coverage. Next, step 2204 comprises obtaining, by the processing system, a location of the mobile communication device. Next, step 2206 comprises predicting, based upon the expected satellite coverage and the location of the mobile communication device, a length of time associated with a predicted satellite coverage gap. Next, step 2208 comprises based upon the length of time associated with the predicted satellite coverage gap, facilitating, by the processing system, an action selected from the following: in a first case that the length of time associated with the predicted satellite coverage gap meets a first time threshold, cause the mobile communication device to enter a dormant state during the length of time associated with the predicted satellite coverage gap; in a second case that a battery state of the mobile communication device meets a power threshold, cause the mobile communication device to enter the dormant state during the length of time associated with the predicted satellite coverage gap; in a third case that the length of time associated with the predicted satellite coverage gap does not meet a second time threshold, and an urgency to transmit outgoing data meets an outgoing data urgency threshold, cause the mobile communication device to continue attempting to transmit the outgoing data; in a fourth case that the length of time associated with the predicted satellite coverage gap does not meet the second time threshold, and an urgency to receive incoming data meets an incoming data urgency threshold, cause the mobile communication device to continue attempting to receive the incoming data; or any combination thereof.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments can provide methods and systems for network awareness of discontinuous coverage by non-terrestrial networks (e.g., non-terrestrial LTE, 5G, and/or subsequent generation networks).

As described herein, various embodiments can provide an algorithm that takes input information and generates output information to be used for multiple purposes (e.g., multiple actions can be taken to avoid/reduce signaling overhead and/or to prioritize UE traffic on a given communication channel).

As described herein, various embodiments can provide an algorithm that instructs (and/or mandates) a core network not to page a given UE and, instead, hold the paging message until it is predicted that the UE will get into coverage (e.g., to avoid unnecessary signaling overhead).

As described herein, various embodiments can provide a solution that is beneficial to wireless operators that use (or are planning to use) non-terrestrial satellite cells to serve terrestrial user equipment.

As described herein, various embodiments can facilitate sharing of satellite ephemeris data (e.g., sharing of satellite ephemeris data by a non-terrestrial cell with a terrestrial UE device and/or a core network (such as a terrestrial wireless provider core network)).

As described herein, various embodiments can utilize mathematical prediction and/or coverage models (e.g., non-terrestrial RAN coverage models) to estimate start_time and end_time of the serving satellite cell based on time-stamped satellite ephemeris data and UE location. In various examples, start_time and end_time of the serving satellite cell and the neighbouring satellite cells can be used to estimate upcoming coverage, during the satellite coverage, and coverage discontinuity. In various examples, this information can be sent to UE(s) and/or to the core network (e.g., cellular terrestrial network). In various examples, an algorithm can collect start_time and end_time of the serving satellite cell and the neighbouring satellite cells to estimate the available UE satellite coverage, and the upcoming coverage disruption. In addition, the algorithm can collect information of the UE activity (e.g., if UE is connected or was connected to the network recently).

As described herein, various embodiments can provide mechanisms via which a terrestrial network is aware of the availability of satellite coverage and/or a UE is aware of the availability of satellite coverage (including gaps/holes as the UE moves into white space areas).

As described herein, various embodiments can provide mechanisms via which intelligence is applied among the UE, the terrestrial network, and the satellite network, to decide which network the UE should be attached to (and when) and/or to decide which network the UE should be handed-off to (and when).

As described herein, various embodiments can provide instructions to a UE based, for example, on whether a particular UE user has a subscription for satellite service.

As described herein, various embodiments can provide to a UE (e.g., in an emergency) a package of ephemeris data that the UE would use to determine when a satellite would be overhead. The ephemeris data can allow the UE to be aware of when it is (or will be) in a coverage area and when it is (or will be) in a hole/gap area (such hole/gap area can be a hole/gap location and/or a hole/gap time). In one example, the UE can notify a user of the UE when coverage will begin and/or end. In one example, the UE can use the coverage information to go to sleep when there is no coverage (e.g., to save battery life) and then to awake when there is coverage. In various examples, a coverage hole/gap can be for seconds, for minutes, or for hours.

As described herein, various embodiments can operate in the context of a heterogeneous network (e.g., terrestrial and non-terrestrial), wherein various parts of the heterogeneous network can be managed together and wherein various parts of the heterogeneous network can provide various information.

As described herein, various embodiments can utilize artificial intelligence to predict where a given UE will be in the future (e.g., based upon historic location patterns and/or current location).

As described herein, various embodiments can utilize artificial intelligence to predict where satellite coverage will be (e.g., based upon time, orbital location, antenna tilt, beamforming, historical patterns, etc.).

As described herein, various embodiments can utilize artificial intelligence to predict satellite coverage for a given UE (e.g., based upon the terrain/geography of the place where the UE is located-such as on a flat plain or in a mountainous region).

As described herein, various embodiments can operate such that decisions can be made and/or actions can be taken from different points of view (e.g., from a point of view of a network and/or from a point of view of a UE). For example, a network can take certain action(s) to avoid wasting resources and a given UE can take different action(s) to avoid wasting resources.

As described herein, various embodiments can provide for a UE to send a radio link failure report saying exactly where and when each coverage hole/gap happened. This report can be used to refine one or more coverage maps.

As described herein, various embodiments can provide for a UE to estimate serving cell coverage, upcoming coverage, and/or coverage discontinuity. The UE can then act on this information (e.g., to conserve resources such as battery).

As described herein, a terrestrial UE located under the coverage from a satellite constellation may experience multiple RLF events, since the satellite constellation may have several coverage holes/gaps. In addition, there may be large coverage holes/gaps in between consecutives satellite constellations. In other words, satellite cell constellations may pass over a given UE device every several hours (e.g., Constellation #1:8-9:30 am, Constellation #2:1-3 pm, Constellation #3:10-11 pm). Under these circumstances, UE devices may typically (absent use of various embodiments described herein) try to search for and connect to a satellite cell when it is not orbiting around. This typical behavior will (absent use of various embodiments described herein) often result in battery drainage (since the UE device would waste battery attempting to connect to satellite cell when this is not available). Various embodiments eliminate (or at least reduce) such undesirable effects.

As described herein, an LTE/5G core network may not (absent use of various embodiments described herein) be aware that a UE is in a satellite cell coverage hole/gap. In this situation, such core network will not be able to page the UE if incoming data is received for this UE. In other words, if data arrives for this UE, the core network will not be able to find the UE in the network and it will traditionally send paging messages to a large number of cells in the network (which may result in traffic overload-even though the UE is not able to receive the paging message). Various embodiments eliminate (or at least reduce) such undesirable effects.

Figure 3:
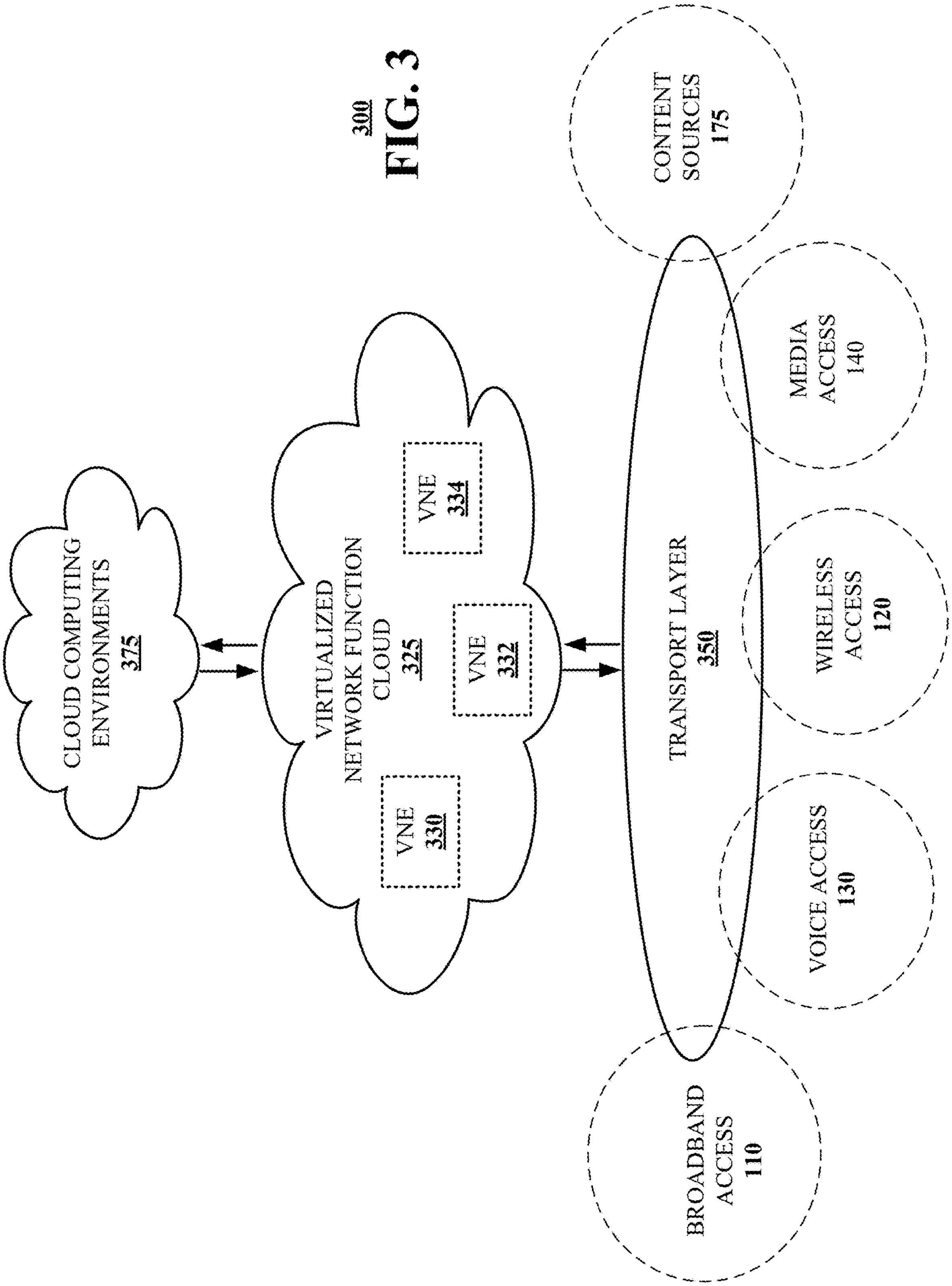
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 200, some or all of the subsystems and functions of system 250, and/or some or all of the functions of methods 2000, 2100, 2200. For example, virtualized communication network 300 can facilitate in whole or in part traffic management for non-terrestrial satellite networks (e.g., traffic management carried out by a network and/or traffic management carried out by user equipment).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
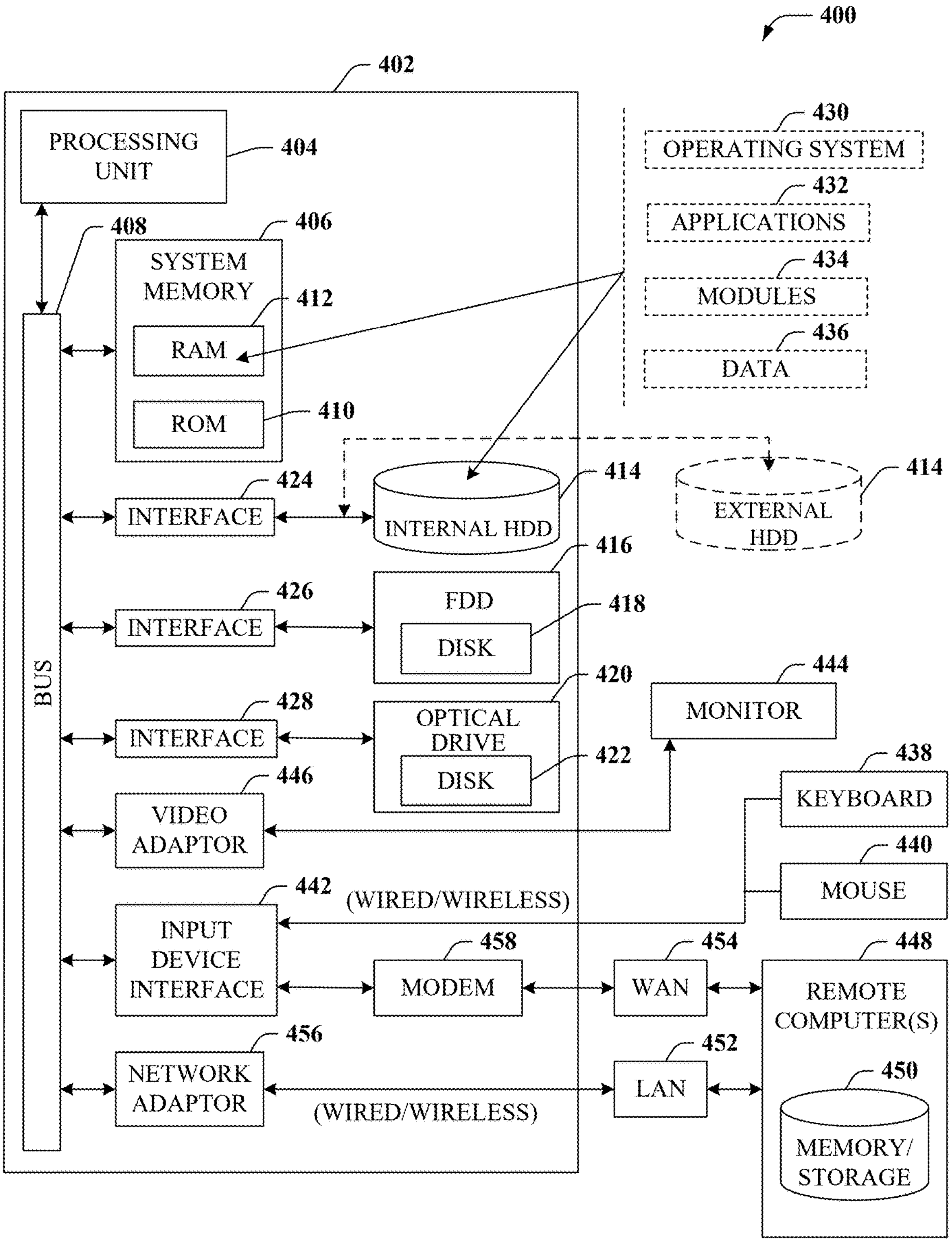
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part traffic management for non-terrestrial satellite networks (e.g., traffic management carried out by a network and/or traffic management carried out by user equipment).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
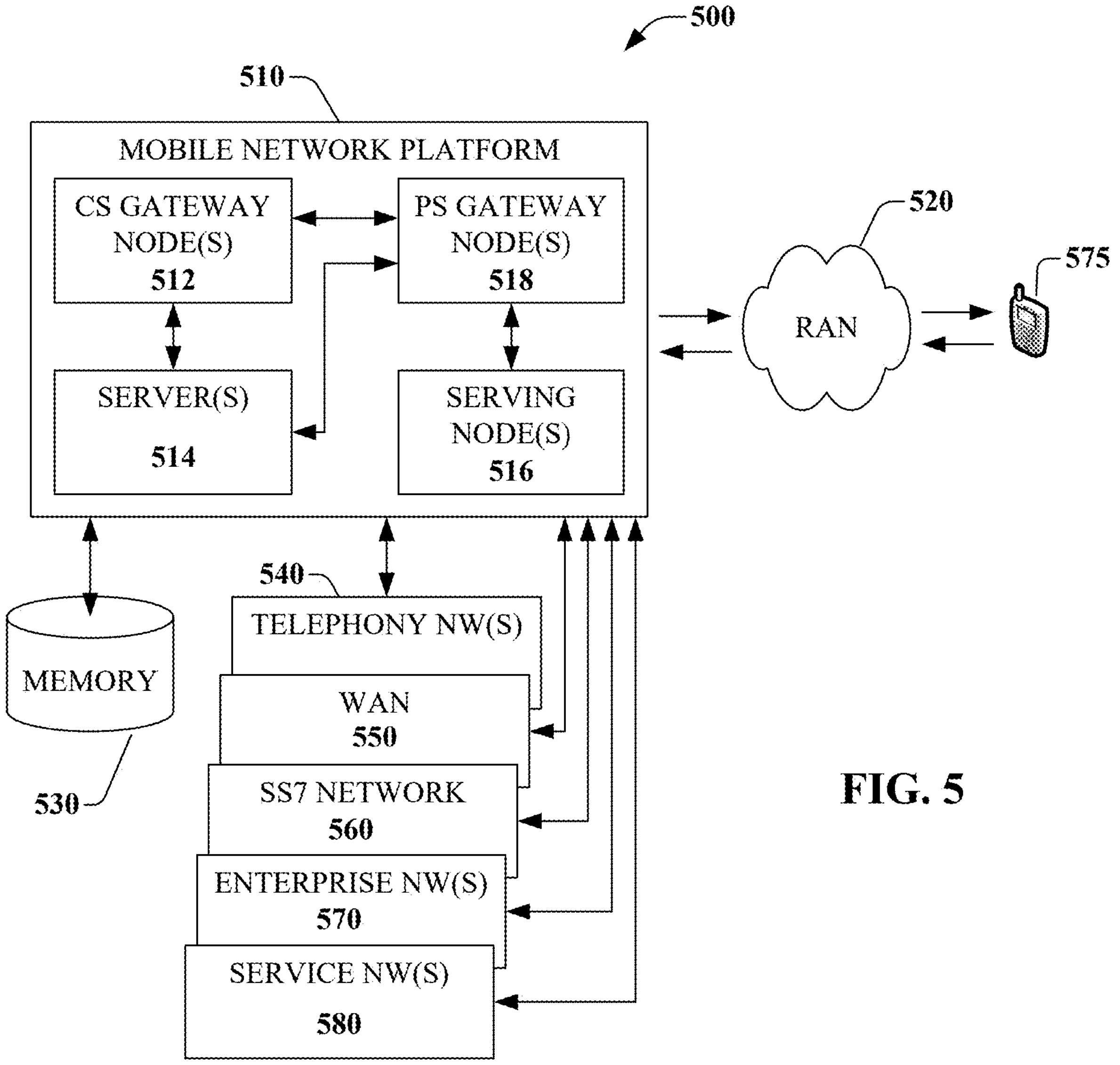
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part traffic management for non-terrestrial satellite networks (e.g., traffic management carried out by a network and/or traffic management carried out by user equipment). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
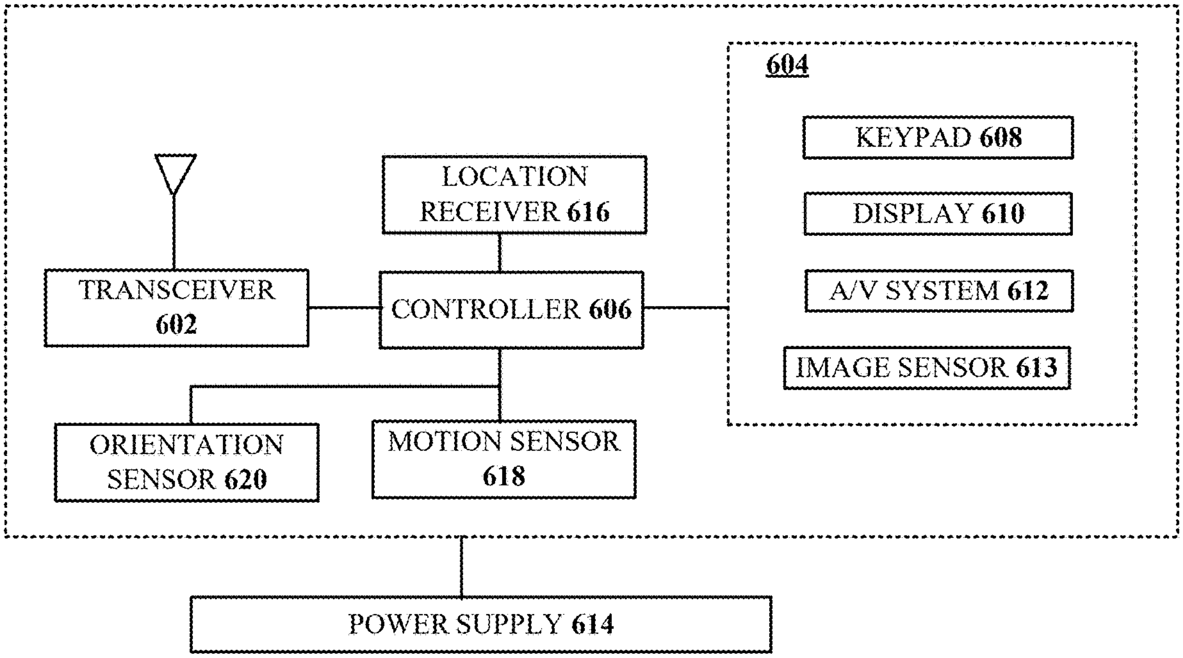
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part traffic management for non-terrestrial satellite networks (e.g., traffic management carried out by a network and/or traffic management carried out by user equipment).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically managing traffic by a network and/or by user equipment) can employ various AI-based schemes for carrying out various embodiments thereof. Moreover, the classifier can be employed to determine a ranking or priority of each satellite, each end-user device, and/or each end-user. A classifier is a function that maps an input attribute vector, $x=(x_1, x_2, x_3, x_4 \ldots x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the satellite(s), end-user device(s), and/or end-user(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:

a processing system including a processor; and a memory that stores executable instructions that, when executed by the processing system, facilitate performance of operations, the operations comprising:

obtaining satellite data indicative of satellite communication coverage areas associated with a plurality of satellites, wherein the satellite data includes locations for the satellite communication coverage areas as well as duration times for the satellite communication coverage areas;

obtaining mobile device data associated with a plurality of mobile devices that are respectively attached to a wireless network, wherein the mobile device data indicates a respective location of each of the plurality of mobile devices, and wherein the plurality of mobile devices includes a first mobile device;

determining whether the wireless network has information to be sent to the first mobile device, resulting in a first determination;

determining, based upon the satellite data and a first location of the first mobile device, whether a period of time that the first mobile device is predicted to be out of the satellite communication coverage areas meets a threshold, resulting in a second determination; and responsive to the first determination being that the wireless network has information to be sent to the first mobile device and to the second determination being that the period of time meets the threshold, facilitating an action selected from:

prohibiting the wireless network from sending a paging message to the first mobile device during the period of time;

discarding the information that was to be sent to the first mobile device; or not taking additional actions and allowing data to be attempted to be transmitted from the wireless network to the mobile device.

2. The device of claim 1, wherein:

the satellite data is based upon one or more data files with satellite ephemeris data; and the plurality of satellites comprise a constellation of Low Earth Orbit (LEO) satellites.

3. The device of claim 1, wherein the wireless network comprises a wireless terrestrial network, a non-terrestrial satellite network, or any combination thereof.

4. The device of claim 3, wherein the device is part of the wireless network.

5. The device of claim 1, wherein:

the information that was to be sent to the first mobile device comprises data, a text message, an SMS, a voice call, audio data, video data, or any combination thereof; and the period of time meeting the threshold comprises the period of time being equal to or greater than the threshold.

6. The device of claim 1, wherein each location of each satellite communication coverage area comprises:

a respective geographic area;

a respective set of bounding latitudes and longitudes;

a respective geospatial identification; or any combination thereof.

7. The device of claim 1, wherein:

each location of each satellite communication coverage area comprises a current location; and the satellite data further includes a predicted future location for each satellite communication coverage area as well as a predicted future duration time corresponding to each predicted future location.

8. The device of claim 1, wherein each duration time for each satellite communication coverage area comprises a respective time specified at a lowest granularity level of days, a respective time specified at a medium granularity level of hours, a respective time specified at a highest granularity level of minutes, or any combination thereof.

9. The device of claim 1, wherein each location of each of the plurality of mobile devices comprises:

a respective geographic location;

a respective latitude/longitudes pair a respective geospatial identification; or any combination thereof.

10. The device of claim 1, wherein the first location of the first mobile device comprises a current location and a predicted future location.

11. The device of claim 1, wherein each time corresponding to each location of each of the plurality of mobile devices comprises a respective time specified at a lowest granularity level of days, a respective time specified at a medium granularity level of hours, a respective time specified at a highest granularity level of minutes, or any combination thereof.

12. The device of claim 1, wherein each of the plurality of mobile devices comprises a respective smartphone, a respective cellphone, a respective tablet computer, a respective laptop computer, or any respective combination thereof.

13. The device of claim 1, wherein each of the plurality of mobile devices being attached to the wireless network comprises each of the plurality of mobile devices being:

in a respective idle mode; or in a respective connected mode.

14. The device of claim 1, wherein the operations further comprise:

generating a satellite coverage map; and transmitting the satellite coverage map to one or more of the plurality of mobile devices, wherein the satellite coverage map facilitates a performing of a mobile device action by the one or more of the plurality of mobile devices.

15. A non-transitory machine-readable medium comprising executable instructions that, when executed by a processing system including a processor, facilitate performance of operations, the operations comprising:

obtaining, for a constellation of Low Earth Orbit (LEO) satellites, satellite ephemeris data;

predicting, based upon the satellite ephemeris data, a coverage map, wherein the coverage map comprises predicted locations at which satellite communications coverage will be available as well as respective times associated with the predicted locations;

predicting for a first end-user device of a plurality of end-user devices one or more future locations, resulting in one or more predicted future locations;

determining, based upon the coverage map and the one or more predicted future locations, a predicted time at which the first end-user device is predicted to be out of the satellite communication coverage;

determining a time period between a current time and the predicted time;

determining whether the time period meets a time threshold, resulting in a determination; and responsive to the determination being that the time period meets the time threshold, facilitating an action selected from:

prioritizing a downloading of download traffic to the first end-user device;

prioritizing an uploading of upload traffic from the first end-user device;

mandating that the first end-user device be disconnected from a network node prior to the predicted time; or any combination thereof.

16. The non-transitory machine-readable medium of claim 15, wherein:

the prioritizing of the downloading of the download traffic to the first end-user device comprises prioritizing relative to one or more other end-user devices;

the prioritizing of the uploading of the upload traffic from the first end-user device comprises prioritizing relative to one or more other end-user devices; and the time period meeting the time threshold comprises the time period being equal to or less than the time threshold.

17. A method comprising:

receiving, by a processing system of a mobile communication device including a processor, data identifying expected satellite coverage;

obtaining, by the processing system, a location of the mobile communication device;

predicting, based upon the expected satellite coverage and the location of the mobile communication device, a length of time associated with a predicted satellite coverage gap; and based upon the length of time associated with the predicted satellite coverage gap, facilitating, by the processing system, an action selected from the following:

in a first case that the length of time associated with the predicted satellite coverage gap meets a first time threshold, cause the mobile communication device to enter a dormant state during the length of time associated with the predicted satellite coverage gap;

in a second case that a battery state of the mobile communication device meets a power threshold, cause the mobile communication device to enter the dormant state during the length of time associated with the predicted satellite coverage gap;

in a third case that the length of time associated with the predicted satellite coverage gap does not meet a second time threshold, and an urgency to transmit outgoing data meets an outgoing data urgency threshold, cause the mobile communication device to continue attempting to transmit the outgoing data;

in a fourth case that the length of time associated with the predicted satellite coverage gap does not meet the second time threshold, and an urgency to receive incoming data meets an incoming data urgency threshold, cause the mobile communication device to continue attempting to receive the incoming data; or any combination thereof.

18. The method of claim 17, wherein:

the dormant state comprises radio circuitry of the mobile communication device being turned off;

the location of the mobile communication device is determined via a GPS of the mobile communication device;

in the first case, the length of time associated with the predicted satellite coverage gap meeting the first time threshold comprises the length of time being equal to or greater than the first time threshold;

in the second case, the battery state of the mobile communication device meeting the power threshold comprises the battery state being equal to or less than the power threshold;

in the third case, the urgency to transmit outgoing data meeting the outgoing data urgency threshold comprises the urgency to transmit outgoing data being equal to or less than the outgoing data urgency threshold;

in the fourth case, the urgency to receive incoming data meeting the incoming data urgency threshold comprises the urgency to receive incoming data being equal to or less than the incoming data urgency threshold; and the first time threshold is a same time threshold as the second time threshold.

19. The method of claim 17, wherein the expected satellite coverage comprises expected time period and expected location, and wherein the first time threshold is a different time threshold than the second time threshold.

20. The method of claim 17, wherein the method further comprises:

transmitting a radio link failure report (RLF) message to a wireless network, wherein the RLF message comprises a timestamp and a mobile device location indicator corresponding to a moment that the mobile communication device experienced satellite coverage disruption, and wherein the transmitting of the RLF message occurs when the mobile communication device regains access to the wireless network after the satellite coverage disruption.

* * * * *